(12) United States Patent
Katz et al.

(10) Patent No.: US 6,980,916 B1
(45) Date of Patent: Dec. 27, 2005

(54) MECHANISM FOR GRAPHICAL TEST EXCLUSION

(75) Inventors: Ron Katz, Elyachin (IL); Olga Kuturianu, Bat-Yam (IL); Eran Kinsbrunner, Haifa (IL)

(73) Assignee: Sun Microsystems, Inc., Santa Clara, CA (US)

( * ) Notice: Subject to any disclaimer, the term of this patent is extended or adjusted under 35 U.S.C. 154(b) by 8 days.

(21) Appl. No.: 10/834,488

(22) Filed: Apr. 29, 2004

(51) Int. Cl.[7] .................. G06F 19/00; G06F 11/00; G06F 9/44
(52) U.S. Cl. ................... 702/119; 702/120; 714/25; 717/131; 717/175
(58) Field of Search ............... 702/117, 119, 120, 702/123; 714/25, 26, 738; 717/131, 175; 434/365

(56) References Cited

U.S. PATENT DOCUMENTS

| | | | |
|---|---|---|---|
| 6,219,829 B1 * | 4/2001 | Sivakumar et al. ......... 717/131 |
| 6,397,378 B1 * | 5/2002 | Grey et al. ................. 717/175 |
| 6,868,508 B2 * | 3/2005 | Grey ............................ 714/25 |

* cited by examiner

*Primary Examiner*—Michael Nghiem
*Assistant Examiner*—John Le
(74) *Attorney, Agent, or Firm*—Meyertons Hood Kivlin Kowert & Goetzel, PC; B. Noël Kivlin

(57) ABSTRACT

Methods and systems for administratively qualifying and disqualifying test programs of a suite as excludable from performance by a client are disclosed in conjunction with a test framework. Using a graphical user interface that represents the suite as a hierarchy or tree, an administrator is able to select test programs or entire divisions of a tree in order to disqualify these elements from exclusion by clients. The results of the operation are compactly stored in a table of excludable records, as pointers to a node of the tree, rather than individual elements of the subtree headed by the node. Using the same graphical user interface, the client is allowed to see only those elements of the tree that have not been disqualified by the administrator. The client can select visible elements of the tree to prevent one or more test programs of the suite from being executed.

32 Claims, 6 Drawing Sheets

MECHANISM FOR GRAPHICAL TEST EXCLUSION

CROSS-REFERENCE TO RELATED APPLICATIONS

This Application is related to Application No. 10/767,849, entitled "Automated Test Execution Framework with Central Management," filed 29 Jan. 2004.

BACKGROUND OF THE INVENTION

1. Field of the Invention

This invention relates improvements in software and hardware design verification. More particularly, this invention relates to methods and systems for centrally managing the composition and execution of test suites for verification of different hardware and software.

2. Description of the Related Art

The meanings of acronyms and certain terminology used herein are given in Table 1. The terms Sun, Sun Microsystems, Java, J2EE, J2ME, J2SE, and the Sun logo are trademarks or registered trademarks of Sun Microsystems, Inc., in the United States of America and other countries. All other company and product names may be trademarks of their respective companies.

TABLE 1

| | |
|---|---|
| API | Application programming interface |
| CLDC | Connected, limited device configuration. CLDC is suitable for devices with 16/32-bit RISC/CISC microprocessors/controllers, having as little as 160 KB of total memory available. |
| HTTP | HyperText Transfer Protocol |
| ID | Identifier |
| IP | Internet Protocol |
| J2EE | Java 2 Enterprise Edition |
| J2ME | Java 2 Micro Edition |
| J2SE | Java 2 Standard Edition |
| JAD | Java application descriptor |
| JAR | Java archive |
| JDTS | Java Device Test Suite execution framework |
| MIDlet | A MIDP application |
| MIDP | Mobile information device profile. A set of Java APIs, which, together with the CLDC, provides a complete J2ME application runtime environment targeted at mobile information devices. |
| Platform | An underlying system on which application programs can run on a computing device. It typically includes an operating system, and can include supporting hardware, which may be either standardized, or customized for a particular computing device. |

Tools have been developed in recent years to aid in the design verification of hardware and software systems, for example software suites, hardware circuitry, and programmable logic designs. In order to assure that the design complies with its specifications, it is common to generate a large number of input or instruction sequences to assure that the design operates as intended under a wide variety of circumstances. In general, test systems produce a report indicating whether test programs have been passed or failed, and in some cases may even indicate a module that is estimated to be faulty.

Conventionally, test systems employing complex test suites use a computer-implemented testing framework for computing devices, such as mobile information devices, and for testing software designed to run on such devices. A developer submits a computing product under development, typically a computing device or software that is designed to run on the device to the test system, which runs a selected battery of test programs on the product while monitoring its behavior. Each product under test requires an instance of an execution test harness, or the use of a stand-alone test execution API. The latter is described in commonly assigned application Ser. No. 10/347,748, entitled "Generating Standalone MIDlets from a Testing Harness", which is herein incorporated by reference.

In environments where testing of a product is ongoing, different aspects may be tested by different teams. As test results are evaluated, it is often necessary to revise the product under test, or to modify the test suites themselves. In such an environment, communicating such revisions to the different testing teams, maintaining version control, synchronization among the teams, and generally coordinating the testing activities is a difficult management problem. Errors could result in inappropriate testing and the wastage of valuable time and testing resources. Indeed, failure of coordination could result in the release of an inadequately tested product into the marketplace. A related problem when many test suites are being concurrently executed is the effort of setting up each test suite with its own test harness and environment. Bundling the test harness with the test suite is not a good solution, as the effort in maintaining up-to-date versions becomes formidable as the number of concurrently operating test suites increases and when the product or the test suites are frequently modified by different test teams.

There is also a need to further customize the composition of established test suites in a particular session, and in all sessions and clients. For example, a bug may have been discovered in a test or group of test programs comprising a test suite. The system administrator may therefore wish to exclude such test programs from performance by the clients of the test execution harness.

SUMMARY OF THE INVENTION

A centralized system for centrally managing test suites is disclosed in commonly assigned Application No. (STC File No. 47900), entitled "Automated Test Execution Framework with Central Management", which is herein incorporated by reference. In this arrangement, a central repository contains a management unit, available test suites and a single test execution harness or framework. Using the management unit, a system administrator establishes active versions of the various test suites and their individual configurations. End users install clients of the central repository, using a system-provided installer program. In each client, an execution script is created, which downloads the harness and a local configuration file. Then, when the harness is executed at the client, it loads with all designated test suites already installed, configured and ready for execution. The client always has the most current versions of all test suites. Advantageously, all necessary information is obtained from a single central location. A modification of this and similar systems is the subject of the instant invention.

The invention provides methods and systems for verification of a hardware or software design. A test suite is executed in conjunction with a test framework for centrally managing the simultaneous or sequential execution of multiple test suites on one or more devices or simulators. Inventive techniques for optimally configuring the test suite initially involve a step of administrative qualification or disqualification of test programs in the suite as optionally excludable from performance. Using a graphical user interface that hierarchically displays the test suite as a tree, an administrator is able to select test programs or entire divisions of the tree in order either to disqualify selected test programs, to designate them such that they cannot be excluded by clients, or to qualify them for client exclusion. The results of the operation are compactly stored in a table of excludable records, as pointers to nodes of the tree. Using the same or a different graphical user interface, the client sees only those elements of the tree that have not been disqualified or designated as non-excludable by the administrator, and may select from among them to prevent one or more test programs of the test suite from being executed.

The invention provides a method for managing the composition and execution of test suites in testing a computing product, which is carried out by storing a suite of test programs for execution using the computing product, wherein the suite is organized in a hierarchy. The method is further carried out by hierarchically displaying the suite, and selecting qualified test programs from the suite, the qualified test programs being optionally excludable from performance. The method is further carried out by transmitting a pointer to a node of the hierarchy to a client, wherein all of the test programs that are located in a subtree headed by the node are included in the qualified test programs, and executing at least a portion of the test programs using the computing product responsively to the pointer.

An aspect of the method includes hierarchically displaying only the qualified test programs to the client, the qualified test programs being selectable by the client for performance thereof.

In another aspect of the method a hierarchical display to the client limited to the qualified test programs is achieved by disposing a representation of a subtree of the suite on a graphical user interface responsively to the pointer.

An additional aspect of the method includes selecting one of the qualified test programs via the graphical user interface as an excluded test program, and while executing the test programs, avoiding performance of the excluded test program.

Another aspect of the method includes selecting one of the qualified test programs via a master exclude list as an excluded test program, and while executing the test programs, avoiding performance of the excluded test program.

The invention provides a computer software product, including a computer-readable medium in which computer program instructions are stored, which instructions, when read by a computer, cause the computer to perform a method for managing the composition and execution of test suites in testing a computing product, which is carried out by storing a suite of test programs for execution using the computing product, wherein the suite is organized in a hierarchy. The method is further carried out by hierarchically displaying the suite, and selecting qualified test programs from the suite, the qualified test programs being optionally excludable from performance. The method is further carried out by transmitting a pointer to a node of the hierarchy to a client, wherein all of the test programs that are located in a subtree headed by the node are included in the qualified test programs, and executing at least a portion of the test programs using the computing product responsively to the pointer.

The invention provides a verification system for managing the composition and execution of test suites in testing a computing product, including a server, a memory in the server for storing a suite of test programs for execution using the computing product, the suite being organized in a hierarchy. The system further includes a terminal for hierarchically displaying the suite, an editor adapted for selection of qualified test programs from the suite, wherein the qualified test programs are optionally excludable from performance, and a communication facility for transmitting a table of the qualified test programs to a client, wherein the table of the qualified test programs includes a pointer to a node of the hierarchy, and wherein all of the test programs that are located in a subtree headed by the node are included in the qualified test programs.

The invention provides a method for managing the composition and execution of test suites in testing a computing product, which is carried out by receiving a table including qualified programs of a suite of test programs, the qualified programs being qualified for exclusion from performance, wherein the suite is organized as a hierarchy of the test programs, and the table includes a pointer to a node of the hierarchy, and wherein all of the test programs that are located in a subtree headed by the node are included in the qualified programs. The method is further carried out by hierarchically displaying the qualified programs, selecting one of the qualified programs to be excluded from performance to define an excluded test program, executing the suite of test programs using the computing product, and while executing the suite of test programs, avoiding performance of the excluded test program.

An aspect of the method executing the suite of test programs includes executing unqualified test programs of the suite.

The invention provides a method for managing the composition and execution of test suites in testing a computing product, which is carried out by providing a central repository holding a suite of test programs, an execution test harness, an installer, and a graphical user interface for modifying the suite, displaying the suite as a hierarchy on the graphical user interface, selecting qualified test programs from the suite via the graphical user interface, the qualified test programs being excludable from performance by a client of the execution test harness, and transmitting a record of the qualified test programs to the client.

According to one aspect of the method, the record of the qualified test programs includes a pointer to a node of the hierarchy, wherein all of the test programs in a subtree headed by the node are included in the qualified test programs.

A further aspect of the method includes downloading the installer to the client, and responsively to an execution of the installer in the client, downloading and installing at least a portion of the test programs from the central repository to the client for use by the client in testing the computing product, and avoiding performance of any of the excluded test programs.

The invention provides a computer software product, including a computer-readable medium in which computer program instructions are stored, which instructions, when read by a computer, cause the computer to perform a method for managing the composition and execution of test suites in testing a computing product, which is carried out by receiving a table including qualified programs of a suite of test programs, the qualified programs being excludable from performance, wherein the suite is organized as a hierarchy of the test programs, and the table includes a pointer to a node of the hierarchy, and wherein all of the test programs that are located in a subtree headed by the node are included in the qualified programs. The method is further carried out by hierarchically displaying the qualified programs, selecting one of the qualified programs to be excluded from performance to define an excluded test program, executing the suite of test programs using the computing product, and while executing the suite of test programs, avoiding performance of the excluded test program.

The invention provides a computer software product, including a computer-readable medium in which computer program instructions are stored, which instructions, when read by a computer, cause the computer to perform a method for testing a computing product, which is carried out by providing a central repository holding a suite of test programs, an execution test harness, an installer, and a graphical user interface for modifying the suite, displaying the suite as a hierarchy on the graphical user interface, using the graphical user interface to select qualified test programs from the suite, the qualified test programs being excludable from performance by a client of the execution test harness, and transmitting a record of the qualified test programs to the client.

The invention provides a verification system for managing the composition and execution of test suites in testing a computing product, including a client terminal that receives a table including qualified programs of a suite of test programs from a server, the qualified programs being qualified for exclusion from performance. The suite is organized as a hierarchy of the test programs, and the table includes a pointer to a node of the hierarchy, wherein all of the test programs that are located in a subtree headed by the node are included in the qualified programs. The system includes a graphical user interface in the client terminal that hierarchically displays the qualified programs for selection thereof. The client terminal is adapted, responsively to a selection via the graphical user interface of an excluded test program, to execute the suite of test programs using the computing product, and to avoid performance of the excluded test program.

The invention provides a verification system for managing the composition and execution of test suites in testing a computing product, including a server, a memory in the server that stores a central repository holding a suite of test programs, an execution test harness, an installer, and a graphical user interface for modifying the suite, a terminal displaying the suite as a hierarchy on the graphical user interface, qualified test programs from the suite being selectable via the graphical user interface. The system includes a communications facility for transmitting a record of the qualified test programs, and a client terminal linked to the server for hierarchically displaying only the qualified test programs responsively to receiving the record from the server. The qualified test programs are selectable as excluded test programs.

According to an aspect of the verification system, the server is adapted to download the installer to the client terminal. Responsively to an execution of the installer, the server is further adapted to download and install at least a portion of the test programs from the central repository to the client terminal for execution using the computing product, while avoiding execution of any of the excluded test programs.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet.

System Architecture.

Figure 1:
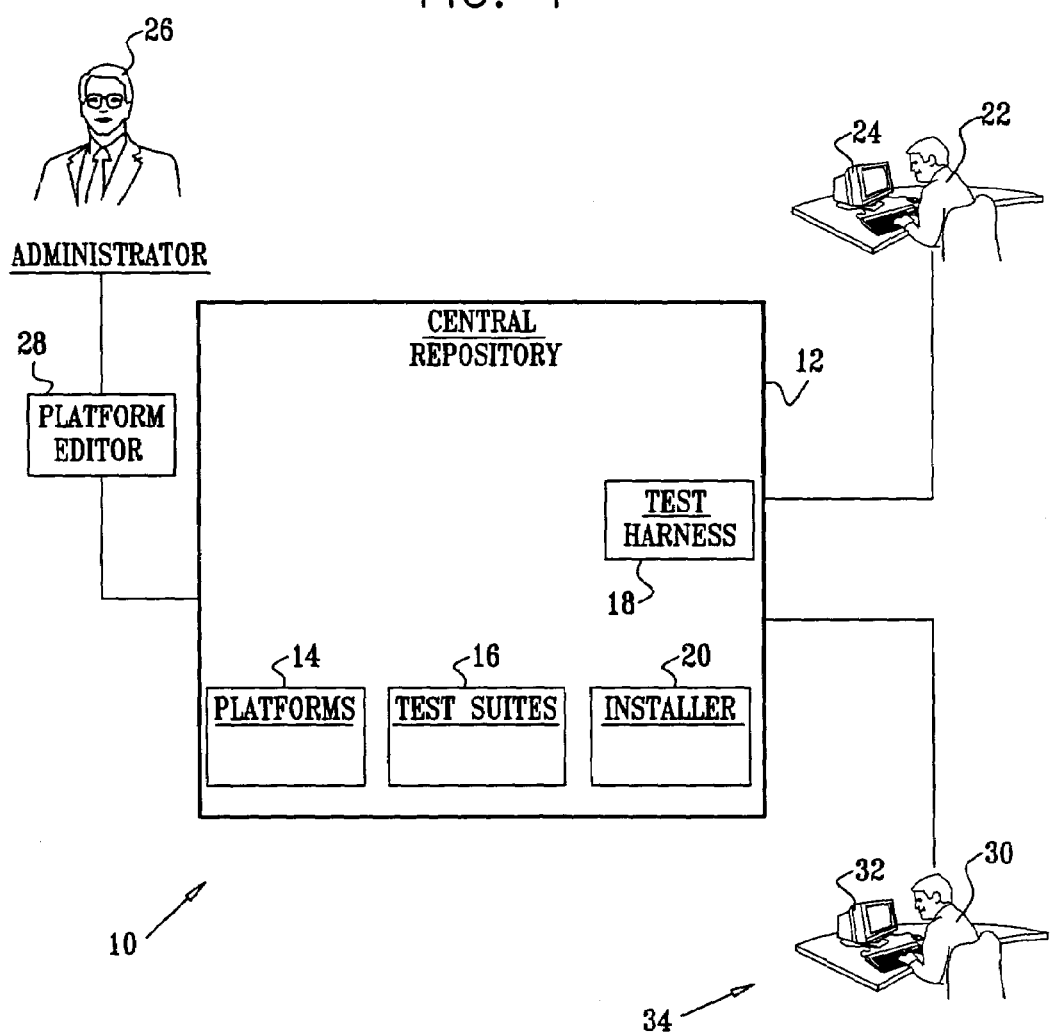
FIG. 1 is a high level block diagram of a system for centrally managing the simultaneous or sequential execution of multiple test suites for verification of different hardware and software designs, in accordance with a disclosed embodiment of the invention.

Turning now to the drawings, reference is initially made to FIG. 1, which is a high level block diagram of a system 10 for centrally managing the simultaneous or sequential execution of multiple test suites on different platforms for verification of different hardware and software designs in accordance with a disclosed embodiment of the invention. The heart of the system 10 is a central repository 12, which can reside on a local or a remote server, and which contains data structures necessary for multiple clients (test consoles) of the central repository 12 to perform testing simultaneously, or at different times. The central repository 12 holds data structures that define platforms 14, test suites 16, an execution test harness 18, and an installer 20. The installer 20 creates a script for launching the framework. The script includes paths to binary files of the test execution framework. The binaries themselves are located in only one place, the central repository 12. Centrally locating the binary files is highly advantageous, as only one instance of each binary file need be updated. Furthermore, each user is guaranteed to see the most current version of the framework. Because distribution of local copies of the binaries is avoided, users need not be concerned about having outdated software. The execution test harness 18 may be implemented as a modification of the test framework "Java Device Test Suite" (JDTS) (version 1.0 or higher), available from Sun Microsystems, Inc., which employs MIDP.

Typically the installation is packaged in an archive, such as a JAR file. The system 10 is capable of being controlled by a single operator 22, using a client terminal 24. However, in many environments it is desirable that a superuser, or administrator 26, manages the central repository 12. This is done using a platform editor 28, which acts as a management unit. Using the platform editor 28, the administrator 26 is capable of reconfiguring the platforms 14, test suites 16, execution test harness 18, and installer 20. An end user 30 interacts with the central repository 12 via a client terminal 32. The end user 30 launches an execution package, which is first downloaded and installed from the central repository 12 using conventional communication facilities. The end user 30 and the terminal 32 may be co-located with the other components of the system 10, or alternatively may be located remotely and connected to the central repository 12 via a data network. Although only one instance of the end user 30 is shown, it will be understood that many end users can interact with the central repository 12 concurrently, or at different times, using the same or different platforms and the same or different test suites. The end user 30 and the terminal 32 are referred to hereinbelow as a client 34.

The system 10 is suitable for use in many development environments, including MIDlet development using J2ME. It may be adapted to J2EE and J2SE environments using programming techniques known to the art.

System—Functional Organization.

Continuing to refer to FIG. 1, the central repository 12 contains test parameters, platform configuration parameters, framework parameters and the test programs themselves. The end user 30 makes use of the central repository 12 in a "session". In an implementation of a session for a framework application in the execution state, contents of the central repository 12 are stored and loaded. The disclosure of the system implementation is common to the platform editor 28, which manages platforms by using the central repository 12, and by the execution framework, including the installer 20, which creates an execution script and local configuration files. The execution test harness 18 is not downloaded. Its binary files remain on the central repository 12.

Figure 2:
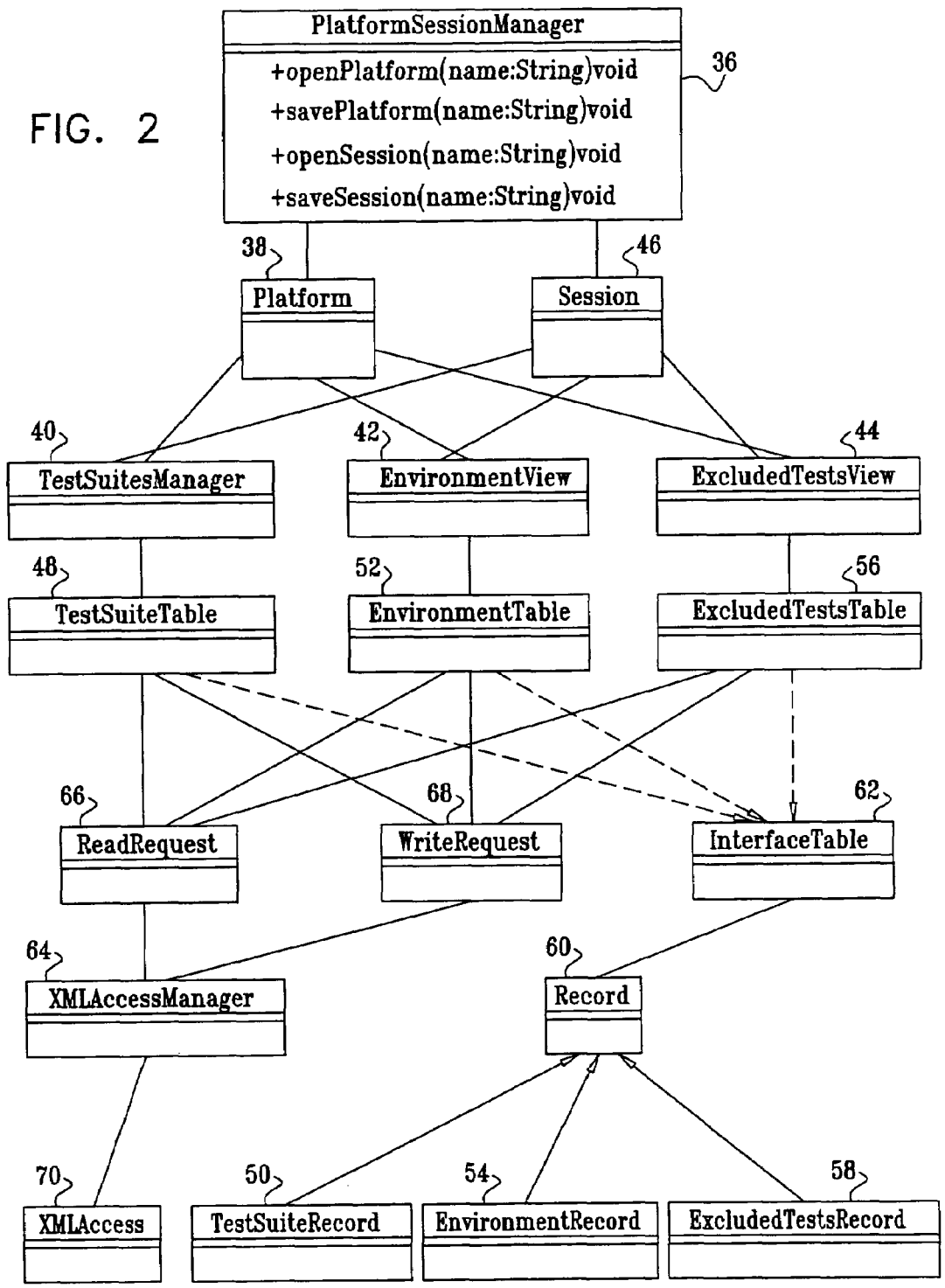
FIG. 2 is a high level functional block diagram of an implementation of a platform editor in the system shown in FIG. 1, in accordance with a disclosed embodiment of the invention.

Reference is now made to FIG. 2, which is a high level functional block diagram of an implementation of the platform editor 28 (FIG. 1) in accordance with a disclosed embodiment of the invention. A class PlatformSessionManager 36 has methods for loading and saving platforms and sessions.

A class Platform 38 encapsulates all platform specific information. An instance of the class Platform 38 includes such information as available test suites, and their respective properties, as well as other platform-specific information. The test suites and their properties are managed by a class TestSuitesManager 40. Platform-specific information is managed by a class EnvironmentView 42. Test programs in the test suites can be excluded from performance by a class ExcludedTestsView 44.

A class Session 46 encapsulates all information specified by the client 34 (FIG. 1). Such client specific information includes the basic properties of the test suites and the platform that applies to a particular session of the client 34.

The class Platform 38 and the class Session 46 interact with the class TestSuitesManager 40, the class EnvironmentView 42, and the class ExcludedTestsView 44.

The class TestSuitesManager 40 interacts with a table TestSuiteTable 48, which contains records of the different test suites, as indicated by a class TestSuiteTable 50.

The class EnvironmentView 42 interacts with a table EnvironmentTable 52, which contains records of known platform environments, as indicated by a representative table EnvironmentRecord 54.

The class ExcludedTestsView 44 interacts with a table ExcludedTestsTable 56, which contains records of excluded test programs, as indicated by a representative class ExcludedTestsRecord 58.

Records originating from the class TestSuiteTable 50, the table EnvironmentRecord 54, and the class ExcludedTestsRecord 58, are included in a class record 60, and initially written to an interface table 62, before being ultimately transferred to an appropriate one of the table EnvironmentTable 52, the table EnvironmentRecord 54, or the table ExcludedTestsTable 56.

A class XMLAccessManager 64 accepts requests from the class TestSuitesManager 40, the class EnvironmentView 42, and the class ExcludedTestsView 44 for read or write operations to and from the class Platform 38 and the class Session 46. The class XMLAccessManager 64 manages queues of read requests 66, write requests 68, and executes them sequentially.

A class XMLAccess 70 contains a single access point to XML files that represent platforms and sessions. It has methods for read/write access to these XML files.

System Operation—Platform Editor.

Figure 3:
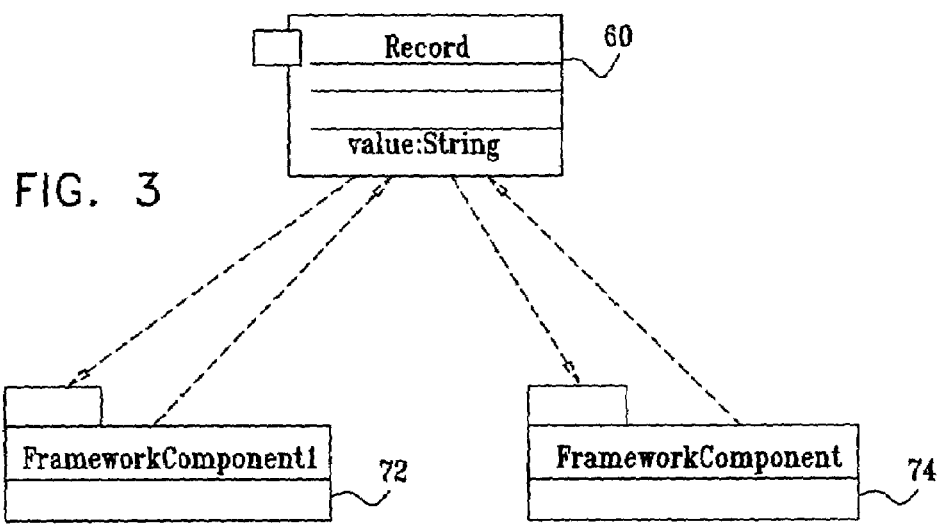
FIG. 3 is a block diagram illustrating the modification of records by the platform editor shown in FIG. 2 in accordance with a disclosed embodiment of the invention.

Reference is now made to FIG. 3, which is a block diagram illustrating the modification of records in the class record 60 (FIG. 2), in which framework components 72, 74 may be extracted from the table TestSuiteTable 50, the table EnvironmentTable 52, and the table ExcludedTestsTable 56.

For example, assume that a test suite x has a parameter that points to its classes directory. This parameter should be written as follows:

TestClassesDir=PARENT_DIR/bin/classes.

A system component replaces the parameter PARENT_DIR according to an entry in a local configuration file, local.configuration, which contains the path to the directory TestClassesDir.

Master Exclude List.

In some applications, it is desirable to remove tests from test suites temporarily. Formerly, this could be done only by recompiling the entire test suite.

A facility for removal of test suites without use of a graphical user interface is provided, using a file that contains a master list of excludable tests, herein referred to as a "master exclude file". An example of a master exclude file is shown in Listing 1. Each test suite having tests available for exclusion using the master exclude file has an entry that is prefixed "TS=", followed by the full name of the test suite.

On a line below this entry is found the path to an excludable node. Thus, in Listing 1, the nodes com.sun.midp.midp1_0, and com.sun.midp.midp2_0.functional.tests.midlet can be excluded from the test suite MIDP 2.0 Tests. The nodes com.sun.wma.functional.Tests.connection.cbs.CBSClose.closeConnection, and com.sun.wma.functional.Tests.security.sms.client can be excluded from the test suite WMA 1.1 Tests.

To remove a node from the master exclude list, it is only necessary to edit the master exclude file, and re-execute the test framework.

The master exclude list is built using a static block or constructor inside a class ExcludedTestsViewImpl, which provides a session view of excluded test records. The master exclude list is loaded only once, when the ExcludedTestsViewImpl is loaded. The class ExcludedTestsViewImpl is disclosed more fully in the above-noted Application No. (STC File No. 47900). The class ExcludedTestsViewImpl has been further modified by the addition of a method is InMasterExclude (String name, String tsName), which returns the value True if a specified node appears in the master exclude list. If so, then the node is not shown to the user. Another method in the class ExcludedTestsViewImpl, is Excluded (String name, String tsName), tests for the existence of a specified test in the excluded test list of the current session. This method has been modified so that it also determines whether a specified node is in the master exclude list. This ensures that the user sees neither nodes in the master exclude list nor nodes that were conventionally excluded by the administrator in the currently loaded profile.

System Operation—Client.

With continued reference to FIG. 1 and FIG. 2, after the client 34 loads a platform from the central repository 12, it creates a session object, that is an instance of the class Session 46, which is based on the platform object, that is the class Platform 38. This session object contains only those basic properties that can be modified by the client 34. The session and platform objects contain all the information taken from the central repository 12, using the path replacement mechanism disclosed above. The client 34 can then operate as if a conventional local installation of the test suite and harness had occurred.

Further details of the system 10 (FIG. 1) and the data structures shown in FIG. 2 are disclosed in the above noted Application No. (STC File No. 47900).

Excluded Test Programs—Server Side.

According to the invention the test suites 16 (FIG. 1) are represented as a hierarchy of test programs. No limitations are placed on the hierarchy, which can have an arbitrary depth, and can be a binary tree, or a tree of any order, and may even vary in the number of branches arising from different nodes.

Figure 4:
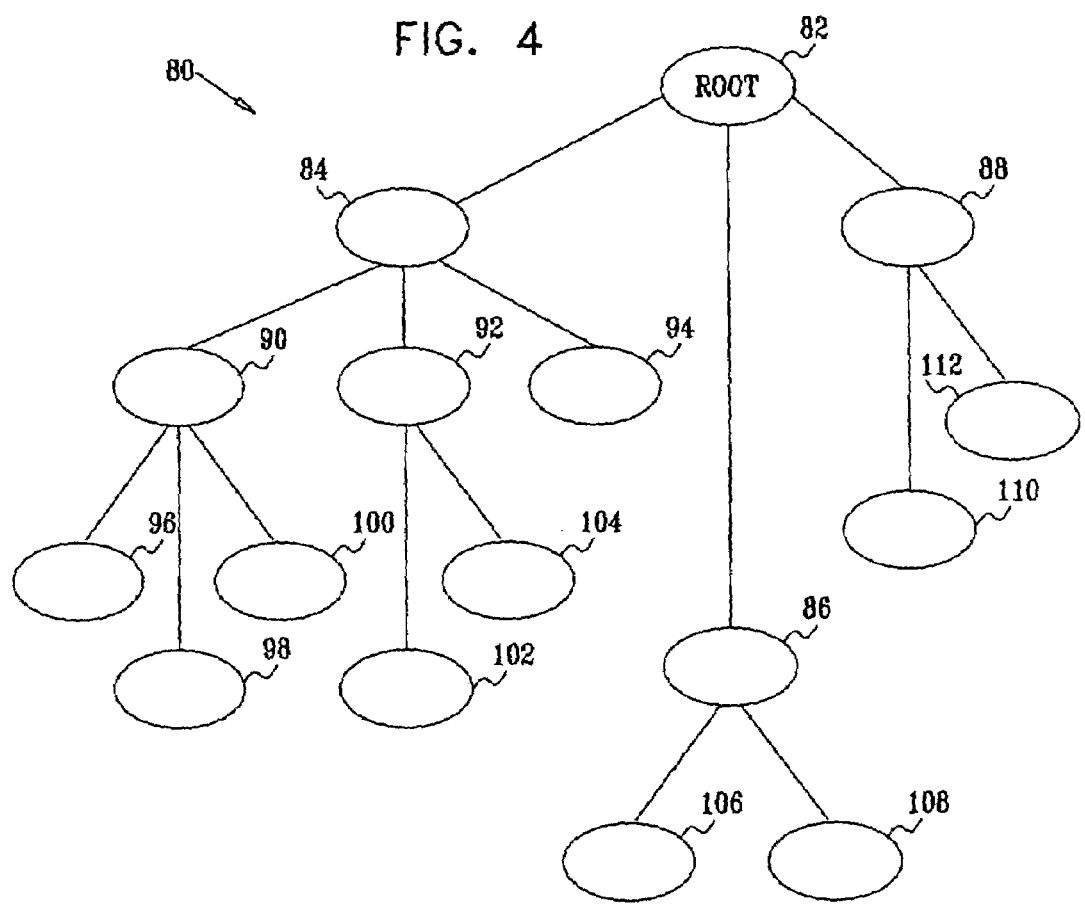
FIG. 4 hierarchically represents a test suite as a tree having ten test programs, represented by leaves of the tree, which may be qualified for exclusion from performance by a client in accordance with a disclosed embodiment of the invention.

Reference is now made to FIG. 4, which illustrates a test suite 80 having ten test programs, elements of which may be administratively qualified for exclusion from performance by a client in accordance with a disclosed embodiment of the invention. The test suite 80 is represented as a multilevel tree having a root node 82, in which nodes represent divisions or subgroups of the test suite 80, and leaves represent test programs of the test suite 80. The root node 82 includes pointers to other nodes. Except for the trivial case of a test suite consisting of a single test program, in general the root node 82 does not contain actual test information. The test suite 80 is divided into three primary divisions 84, 86, 88. The primary division 84 has three secondary divisions 90, 92, 94. The secondary division 90 has three test programs 96, 98, 100. The secondary division 92 has two programs 102, 104. The secondary division 94 consists of a single test program. The primary division 86 has two test programs 106, 108. The primary division 88 has two test programs 110, 112.

An administrative operator builds an instance of the table ExcludedTestsTable 56 (FIG. 1), using the table TestSuiteTable 48 as a reference, and a graphical user interface that provides a convenient hierarchical display of the elements of the test suite 80. The nodes and leaves of the hierarchy can be visited in any order, and can be selected or deselected using the graphical user interface. As will be seen from the discussion below, selection or deselection of a node can affect the parent and the entire subtree of that node.

Figure 5:
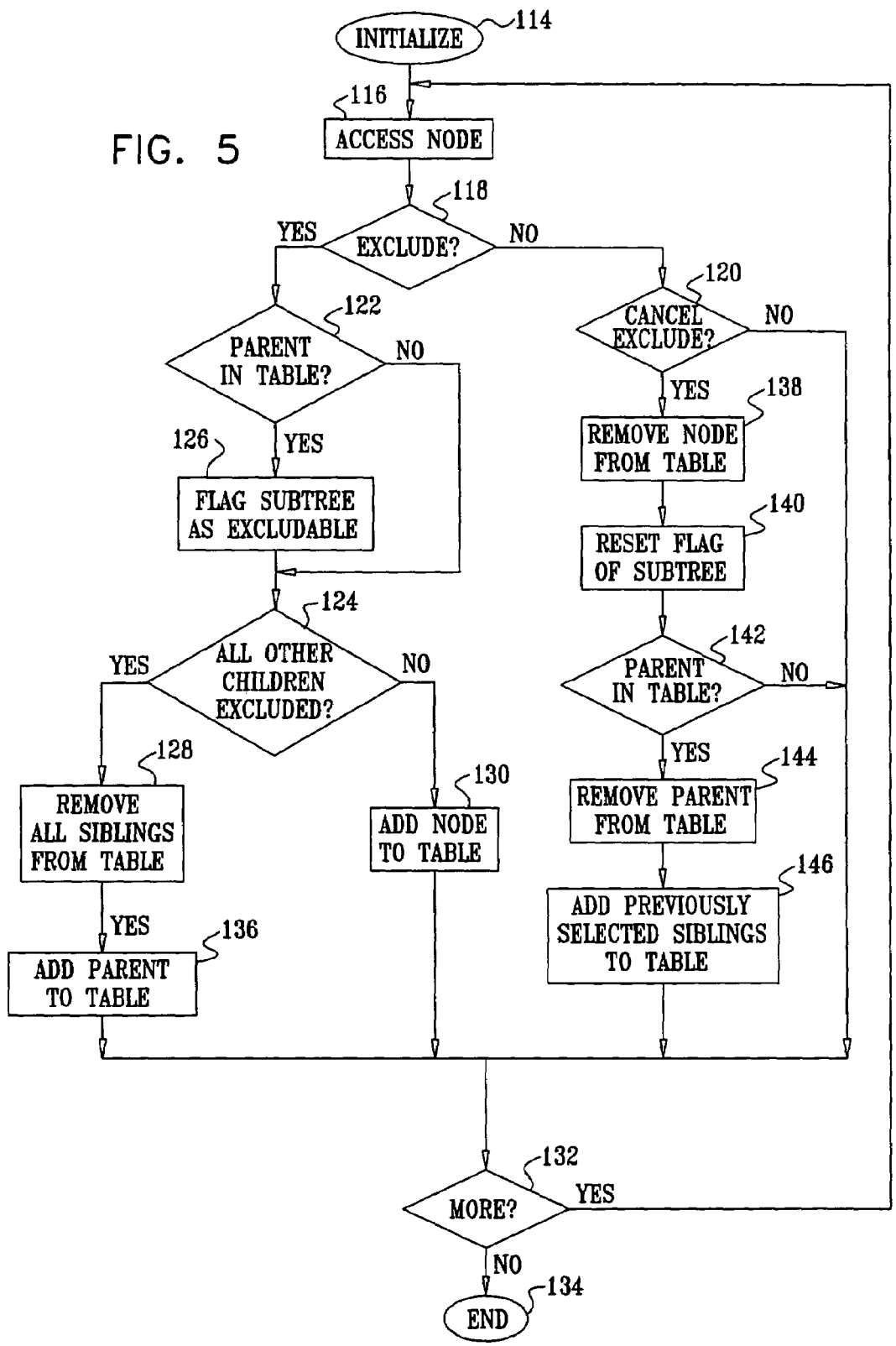
FIG. 5 is a flow chart illustrating a method of qualifying test programs in a test suite for exclusion by a client in accordance with a disclosed embodiment of the invention.

Reference is now made to FIG. 5, which is a flow chart illustrating a method of qualifying test programs in a test suite for exclusion by a client in accordance with a disclosed embodiment of the invention. The purpose of the method is to administratively differentiate those test programs of the test suite that are optionally excludable by a client, from those whose performance is mandatory. Recalling that low end computing devices typically have limited storage, according to the method the configuration of excludable test programs is presented to the client using minimal memory resources, while still displaying the hierarchical relationships of the elements of the test suite. In preparing the table, elements of the test suite hierarchy can have three statuses:

(1) not flagged (not qualified for exclusion);
(2) flagged (at least one element in the subtree headed by the flagged element is qualified as excludable by a client); and
(3) added to table of excluded records (the element and its children are all qualified as excludable by the client).

The method begins at initial step 114. Here a current test suite is accessed. As noted above, this is typically, but not necessarily, accomplished using a graphical user interface, which displays the test suite as a tree according to its predefined hierarchical relationships.

Next, at step 116 an element, which can be either a node or leaf of the tree (FIG. 4), is accessed. This is normally done manually by an operator having administrative privileges. Alternatively, the order of visiting the nodes and leaves of the tree may be accomplished using a "master exclude list". This list is embodied in a text file having a particular format in a special format. Consulting this list enables exclusion of specified nodes from the test suite without interaction with the graphical user interface. However, when the master exclude list is employed, an excluded node is no longer available for recall using the graphical user interface.

Control now proceeds to decision step 118, where it is determined if the test suite element corresponding to the element that was accessed in step 116 is to be qualified as optionally excludable by the client. If the determination at decision step 118 is negative, then control proceeds to decision step 120, which is disclosed below.

If the determination at decision step 118 is affirmative, then control proceeds to decision step 122, where it is determined if the parent of the element that was accessed in step 116 has been previously flagged as having at least one excludable element in its subtree or has been previously added to the table of excluded test programs, details of which are disclosed below. If the parent generation of that node becomes fully selected, more remote ancestral nodes will be affected recursively, as will be evident from the disclosure hereinbelow. If the determination at decision step 122 is negative, then control proceeds to decision step 124, which is disclosed below.

If the determination at decision step 122 is affirmative, then control proceeds to step 126. The subtree headed by the element that was accessed in step 116 is flagged as excludable and a pointer to the element stored.

Control now proceeds to decision step 124, where it is determined if all siblings of the element that was accessed in step 116 are now flagged as excludable. For example, if the test program 98 (FIG. 4) was selected in step 116, the inquiry in decision step 124 would extend only to the test programs 96, 100, as these are the only elements having a common parent with the test program 98, which is the secondary division 90.

Referring again to FIG. 5, if the determination at decision step 124 is affirmative, then control proceeds to step 128, which is disclosed below.

If the determination at decision step 124 is negative, then control proceeds to step 130. The element that was accessed in step 116 is added to the table of excluded test programs. Control then proceeds to decision step 132.

At decision step 132 a determination is made whether more nodes or leaves are to be accessed. If the determination at decision step 132 is negative, then control proceeds to final step 134, and the method terminates. Otherwise, control returns to step 116.

Step 128 is performed if the determination at decision step 124 is affirmative. Here the element that was accessed in step 116 and its siblings are all removed from the table of excluded test programs. The previous status of the node and its siblings is memorized, however, in order to retain a trace of previous accesses. This is essential, should it become necessary to reverse an action taken during performance of the method.

Next, at step 136, the parent of the element that was accessed in step 116 is added to the table of excluded test programs. The result of performing step 116, together with step 136, is a much smaller table of excluded test programs than would be the case if all flagged elements were simply added to the table of excluded test programs. Control next proceeds to decision step 132, which has been described above. Should the parent of the newly excluded node and its sibling all become excluded, there is automatic recursion to the grandparent node.

Decision step 120 is performed when the determination at decision step 118 is negative. Here it is determined whether the access of an element at step 116 was intended to cancel a previous action to exclude that element. If the determination at decision step 120 is negative, then control proceeds to decision step 132. This could occur, for example, if the access in step 116 was in error.

If the determination at decision step 120, then a sequence of steps is undertaken that reverses the operations of the sequence of steps beginning with decision step 122 and ending at decision step 132. Control proceeds to step 138, where the element selected in step 116 is removed from the table of excluded test programs if it had previously been entered.

Next, at step 140, the flag that was previously set in step 126 is reset.

Control now proceeds to decision step 142, where it is determined if the parent of the element selected in step 116 is in the table of excluded test programs. If the determination at decision step 142 is negative, then control proceeds to decision step 132, which has been described above.

If the determination at decision step 142 is affirmative, then control proceeds to step 144. The parent element is removed from the table of excluded test programs It should be noted that there is no automatic recursion to ancestral nodes in this case. If the parent was in the exclude table, then the grandparent node was not in the table. Only the node in the highest level of the hierarchy having all its children selected are found in the exclude table.

Next, at step 146 previously selected siblings of the element selected in step 116 are added to the table of excluded test programs. It will be recalled that the status of the siblings was memorized in step 128 in order to provide for the eventuality that step 146 might need to be performed. Control then proceeds to decision step 132, which has been described above.

Figure 6:
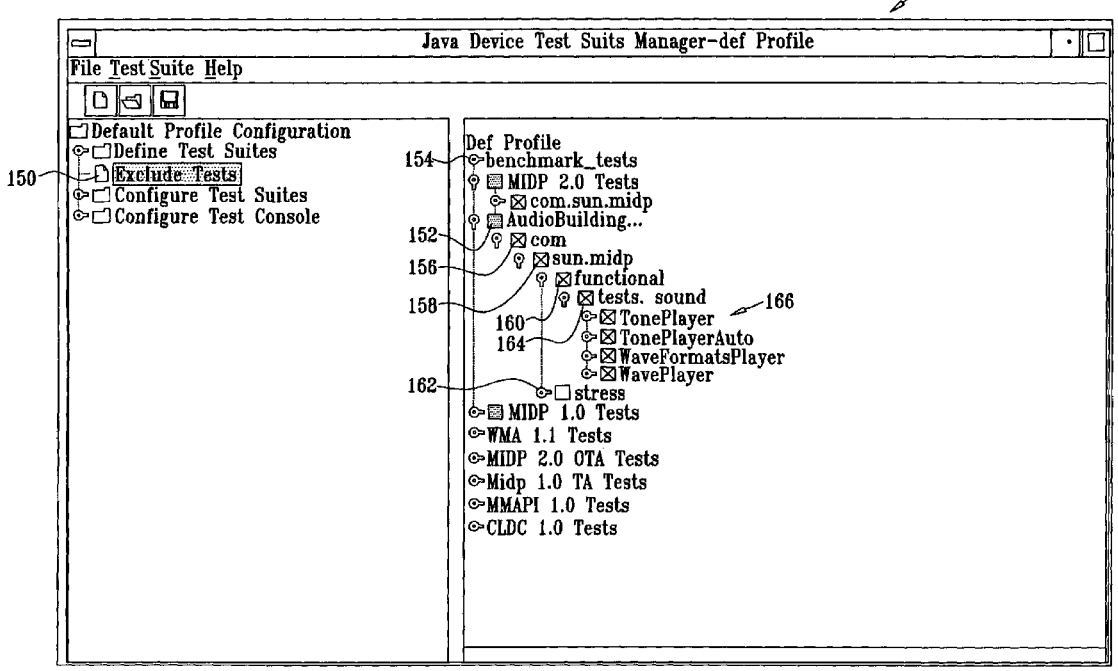
FIG. 6 is a screen display, which illustrates the status of test programs following performance of the method illustrated in FIG. 5 in accordance with a disclosed embodiment of the invention.

Reference is now made to FIG. 6, which is a hierarchical screen display 148, which presents a test suite to the administrative operator following performance of the method disclosed with reference to FIG. 5. The test suite may comprise large numbers of test programs; however only those, which were administratively qualified as excludable by the client, are flagged on the display 148 by an open square icon. While a particular display scheme is presented in the disclosure of FIG. 6, it will be evident to those skilled in the art that many variations of the display 148 could be implemented to apply the principles of the instant invention. The left pane of the display 148 includes a folder 150 that contains excludable test programs. The folder 150 is expanded in the right pane. A division 152 of the test suite, entitled "Audiobuilding" is further expanded in the right pane. The division 152 is associated with a hatched square, indicating that it contains at least one test program that will not be visible to the client, and at least one qualified test program that will be visible. Another division 154, entitled "Benchmark_test programs", will be completely invisible to the client. The division 152 has only one division 156, entitled "com", at the next lower level of the hierarchy. The division 156 is also associated with a hatched square and an "X", the latter indicating that at least one element of its subtree has been disqualified by the administrator, and will be invisible to the client, and at least one test program that will be visible. The subsidiary divisions 158, 160, entitled "sun.midp" and "functional", respectively are associated with different types of square icons. In the case of the division 158, there is a hatched square icon. The division 158 has an edge leading to a test program 162, entitled "stress", which has a clear square icon. The test program 162 has not been disqualified by the administrator; it will be visible to the client, who may choose to exclude it from performance. The division 160 is the parent of yet another division 164, entitled "test programs.sound". The division 164 comprises four test programs 166, associated with clear square icons having an "X", indicating that they have been disqualified from exclusion by the administrator. None of the test programs 166 will be seen by the client.

Excluded Test Programs—Client Side

Referring again to FIG. 1, it is now assumed that the table ExcludedTestsTable 56 has been prepared using the method disclosed with reference to FIG. 5. The table ExcludedTestsTable 56 and the table TestSuiteTable 48 form the basis for presenting test programs of a test suite that have been administratively qualified as excludable by a client. The same graphical user interface that was used to create the table ExcludedTestsTable 56 may be used to display the qualified test programs, with such appropriate modifications, as will be evident to those skilled in the art. Alternatively, a different graphical user interface may be used. The display of the test suite is hierarchical. Subtrees having at least one excludable element, and test programs in the subtrees that are excludable are associated with distinctive indicia of their status.

The graphical user interface remains aware of the hierarchical structure of a current test suite, referencing the table TestSuiteTable 48 (FIG. 1). The user display is constructed "on-the-fly", based on the minimal information contained in the table ExcludedTestsTable 56 (FIG. 1).

Figure 7:
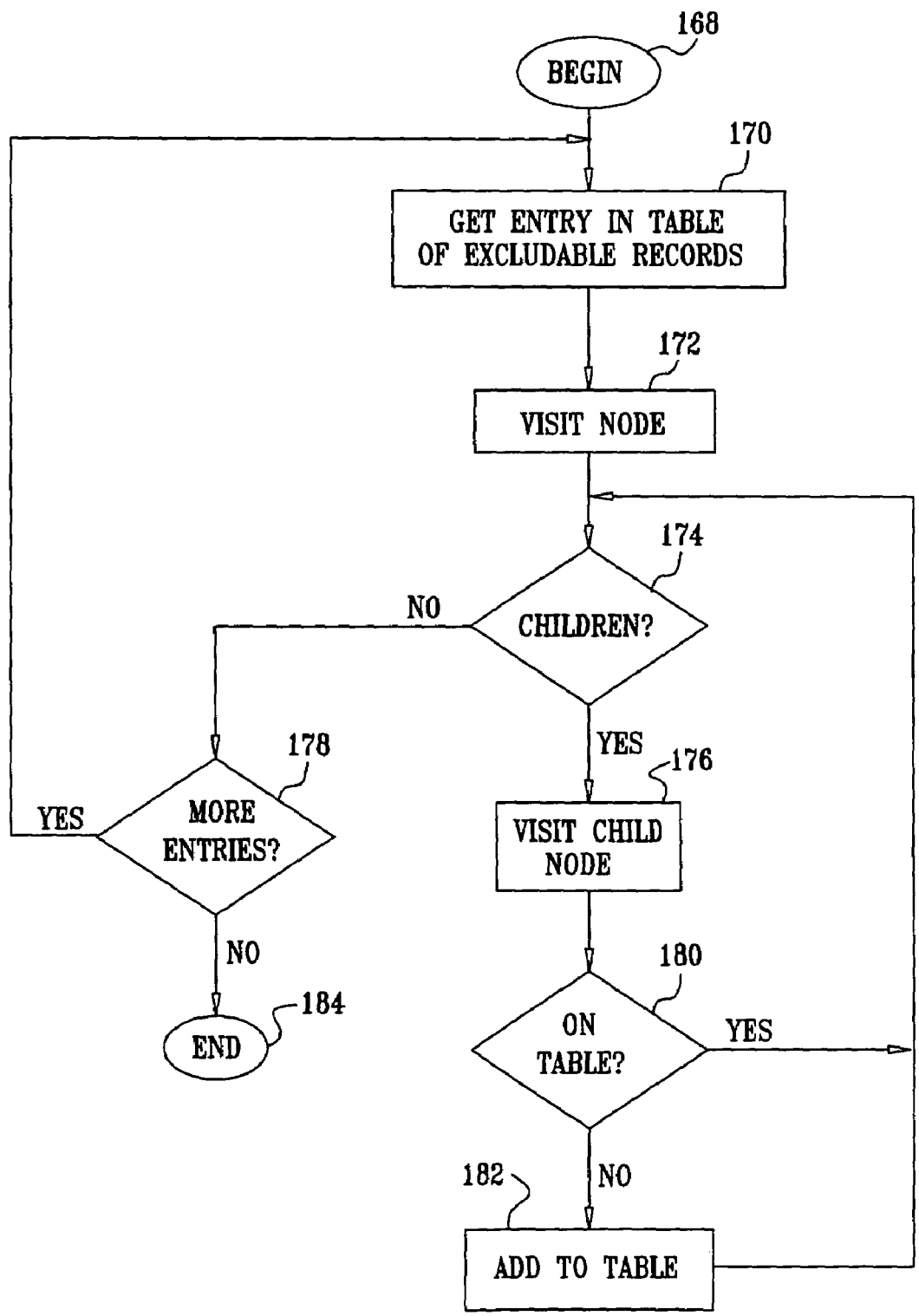
FIG. 7 is a flow chart illustrating a method of presenting test programs of a test suite that have been administratively qualified for exclusion to a client, in accordance with a disclosed embodiment of the invention.

Reference is now made to FIG. 7, which is a flow chart illustrating a method of presenting test programs of a test suite that have been administratively qualified for exclusion to a client in a hierarchical format, in accordance with a disclosed embodiment of the invention. For purposes of FIG. 7, it is assumed that the method disclosed with reference to FIG. 5 has been performed, and that a table of excludable records has been constructed. It will be recalled from the disclosure of FIG. 5, that economy in data storage is achieved by saving a pointer to the highest level in the tree under which all test programs were administratively selected as being excludable by the client, without saving information as to the individual test programs thereunder. The process of building a hierarchical tree and presenting it to the client, using a graphical user interface, begins with initial step 168. A test suite table containing details of the test suite and its hierarchical relationships, for example, the table TestSuiteTable 48 (FIG. 1), is accessed and examined, in order to provide an awareness of the structure of the test suite. A reference hierarchical tree of the test suite is constructed for use by the graphical user interface, based on the test suite table.

Next, at step 170, an entry in the table of excludable records is accessed.

Next, at step 172, a node in the reference hierarchical tree corresponding to the entry that was accessed in step 170 is visited.

Control now proceeds to decision step 174, where it is determined if there are children of the node visited in step 172 to be processed. Decision step 174 is performed recursively, so those nodes at lower levels of the subtree headed by the node visited in step 172 are accessed in turn. If the determination at decision step 174 is affirmative, then control proceeds to step 176. Otherwise, control proceeds to decision step 178, which is described below.

At step 176 a child node of the node that was visited in step 172 is accessed.

Next, at decision step 180, the table of excludable records is examined, and a determination is made whether the child node that was accessed in step 176 appears in this table. If the determination at decision step 180 is affirmative, then the display presented to the client via the graphical user interface may be updated to show this node and its subtree. Control returns to decision step 174.

If the determination at step 176 is negative, then control proceeds to step 182, where the element of the test suite corresponding to the child node that was accessed in step 176 is added to the table of excludable records, and the graphical user interface updated.

Decision step 178 is performed when the determination at decision step 174 is negative. A determination is made whether there are more entries on the original table of excludable records to be evaluated.

If the determination at decision step 178 is affirmative, then control returns to step 170.

If the determination at decision step 178 is negative, then control proceeds to final step 184. At this point, the display presented via the graphical user interface is complete. The client selects actual test programs to exclude. A field of the table of excludable records is updated to reflect the status of these selected test programs. The procedure terminates. The test suite can now be executed using the design-under-test, while avoiding performance of the selected test programs.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

Computer Program Listings.

Listing 1

TS=MIDP 2.0 Tests
com.sun.midp.midp1_0
com.sun.midp.midp2_0.functional.tests.midlet
TS=WMA 1.1 Tests
com.sun.wma.functional.Tests.connection.cbs.CBSClose.close
Connection
com.sun.wma.functional.Tests.security.sms.client

What is claimed is:

1. A method for managing the composition and execution of test suites in testing a computing product, comprising the steps of:

storing a suite of test programs for execution using said computing product, said suite being organized in a hierarchy;

hierarchically displaying said suite;

selecting qualified test programs from said suite, said qualified test programs being excludable from performance; transmitting a pointer to a node of said hierarchy to a client, wherein all of said test programs that are located in a subtree headed by said node are included in said qualified test programs; and executing at least a portion of said test programs using said computing product responsively to said pointer.

2. The method according to claim 1, further comprising the step of hierarchically displaying only said qualified test programs to said client, said qualified test programs being selectable by said client.

3. The method according to claim 2, wherein said step of hierarchically displaying only said qualified test programs to said client is performed by:

responsively to said pointer disposing a representation of a subtree of said suite on a graphical user interface.

4. The method according to claim 3, further comprising the steps of:

selecting one of said qualified test programs via said graphical user interface as an excluded test program; and while executing said test programs, avoiding performance of said excluded test program.

5. The method according to claim 3, further comprising the steps of:

selecting one of said qualified test programs via a master exclude list as an excluded test program; and while executing said test programs, avoiding performance of said excluded test program.

6. A computer software product, comprising a computer-readable medium in which computer program instructions are stored, which instructions, when read by a computer, cause the computer to perform a method for managing the composition and execution of test suites in testing a computing product, comprising the steps of:

storing a suite of test programs for execution using said computing product, said suite being organized in a hierarchy;

hierarchically displaying said suite;

memorizing a selection of qualified test programs from said suite, said qualified test programs being excludable from performance;

transmitting a table of said qualified test programs to a client, wherein said table of said qualified test programs comprises a pointer to a node of said hierarchy, wherein all of said test programs that are located in a subtree headed by said node are included in said qualified test programs; and executing at least a portion of said test programs using said computing product responsively to said pointer.

7. The computer software product according to claim 6, wherein said computer is further instructed to perform the step of hierarchically displaying only said qualified test programs to said client, said qualified test programs being selectable by said client as excludable from performance.

8. The computer software product according to claim 7, wherein said step of hierarchically displaying only said qualified test programs to said client is performed by:

responsively to said pointer displaying a representation of a subtree of said suite via a graphical user interface.

9. The computer software product according to claim 8, further comprising the steps of:

responsively to a selection of one of said qualified test programs via said graphical user interface as an excluded test program;

while executing said test programs, avoiding performance of said excluded test program.

10. The computer software product according to claim 8, further comprising the steps of:

accepting a selection of one of said qualified test programs via a master exclude list as an excluded test program; and while executing said test programs, avoiding performance of said excluded test program.

11. A verification system for managing the composition and execution of test suites in testing a computing product, comprising:

a server;

a memory in said server for storing a suite of test programs for execution using said computing product, said suite being organized in a hierarchy;

a terminal for hierarchically displaying said suite;

an editor adapted for selection of qualified test programs from said suite, said qualified test programs being excludable from performance; and a communication facility for transmitting a table of said qualified test programs to a client, wherein said table of said qualified test programs comprises a pointer to a node of said hierarchy, and wherein all of said test programs that are located in a subtree headed by said node are included in said qualified test programs.

12. The verification system according to claim 11, further comprising a client terminal that is controlled by said server, said client terminal hierarchically displaying only said qualified test programs to said client, said qualified test programs being selectable by said client via said client terminal.

13. The verification system according to claim 12, wherein said client terminal is instructed via said server to display a representation of a subtree of said suite on a graphical user interface responsively to said pointer.

14. The verification system according to claim 13, said server being further adapted, responsively to a selection of one of said qualified test programs via said graphical user interface as an excluded test program, to control execution of said suite using said computing product and to avoid performance of said excluded test program.

15. A method for managing the composition and execution of test suites in testing a computing product, comprising the steps of:

receiving a table comprising qualified programs of a suite of test programs, said qualified programs being qualified for exclusion from performance, wherein said suite is organized as a hierarchy of said test programs, and said table comprises a pointer to a node of said hierarchy, and wherein all of said test programs that are located in a subtree headed by said node are included in said qualified programs;

hierarchically displaying said qualified programs;

selecting one of said qualified programs to be excluded from performance to define an excluded test program;

executing said suite of test programs using said computing product; and while executing said suite of test programs, avoiding performance of said excluded test program.

16. The method according to claim 15, wherein said step of executing said suite of test programs includes executing unqualified test programs of said suite.

17. A method for managing the composition and execution of test suites in testing a computing product, comprising the steps of:

providing a central repository holding a suite of test programs, an execution test harness, an installer, and a graphical user interface for modifying said suite;

displaying said suite as a hierarchy on said graphical user interface;

selecting qualified test programs from said suite via said graphical user interface, said qualified test programs being excludable from performance by a client of said execution test harness; and transmitting a record of said qualified test programs to said client.

18. The method according to claim 17, wherein said record of said qualified test programs comprises a pointer to a node of said hierarchy, wherein all of said test programs in a subtree headed by said node are included in said qualified test programs.

19. The method according to claim 17, further comprising the step of hierarchically displaying only said qualified test programs to said client, said qualified test programs being selectable by said client as excluded test programs.

20. The method according to claim 19, further comprising the steps of:

downloading said installer to said client;

responsively to an execution of said installer in said client; downloading and installing at least a portion of said test programs from said central repository to said client for use by said client in testing said computing product; and avoiding performance of any of said excluded test programs.

21. The method according to claim 17, further comprising the step of selecting one of said qualified test programs via a master exclude list as an excluded test program.

22. A computer software product, comprising a computer-readable medium in which computer program instructions are stored, which instructions, when read by a computer, cause the computer to perform a method for managing the composition and execution of test suites in testing a computing product, comprising the steps of:

receiving a table comprising qualified programs of a suite of test programs, said qualified programs being excludable from performance, wherein said suite is organized as a hierarchy of said test programs, and said table comprises a pointer to a node of said hierarchy, and wherein all of said test programs that are located in a subtree headed by said node are included in said qualified programs;

hierarchically displaying said qualified programs;

selecting one of said qualified programs to be excluded from performance to define an excluded test program;

executing said suite of test programs using said computing product; and while executing said suite of test programs, avoiding performance of said excluded test program.

23. The computer software product according to claim 22, wherein said step of executing said suite of test programs includes executing unqualified test programs of said suite.

24. A computer software product, comprising a computer-readable medium in which computer program instructions are stored, which instructions, when read by a computer, cause the computer to perform a method for testing a computing product, comprising the steps of:

providing a central repository holding a suite of test programs, an execution test harness, an installer, and a graphical user interface for modifying said suite;

displaying said suite as a hierarchy on said graphical user interface;

using said graphical user interface, selecting qualified test programs from said suite, said qualified test programs being excludable from performance by a client of said execution test harness; and transmitting a record of said qualified test programs to said client.

25. The computer software product according to claim 24, wherein said record of said qualified test programs comprises a pointer to a node of said hierarchy, wherein all of said test programs in a subtree headed by said node are included in said qualified test programs.

26. The computer software product according to claim 24, wherein said computer is further instructed to perform the step of hierarchically displaying only said qualified test programs to said client, said qualified test programs being selectable by said client as excluded test programs.

27. The computer software product according to claim 26, wherein said computer is further instructed to perform the steps of:

downloading said installer to said client;

responsively to an execution of said installer in said client; downloading and installing at least a portion of said test programs from said central repository to said client for use by said client in testing said computing product;

executing said portion of said test programs using said computing product; and while executing said suite of test programs, avoiding performance of said excluded test programs.

28. The computer software product according to claim 24, wherein said computer is further instructed to perform the step of accepting a selection of one of said qualified test programs via a master exclude list as an excluded test program.

29. A verification system for managing the composition and execution of test suites in testing a computing product, comprising:

a client terminal receiving a table comprising qualified programs of a suite of test programs from a server, said qualified programs being qualified for exclusion from performance, wherein said suite is organized as a hierarchy of said test programs, and said table comprises a pointer to a node of said hierarchy, and wherein all of said test programs that are located in a subtree headed by said node are included in said qualified programs; and a graphical user interface in said client terminal that hierarchically displays said qualified programs for selection thereof, said client terminal being adapted, responsively to a selection via said graphical user interface of an excluded test program, to execute said suite of test programs using said computing product; and to avoid performance of said excluded test program.

30. A verification system for managing the composition and execution of test suites in testing a computing product, comprising:

a server;

a memory in said server that stores a central repository holding a suite of test programs, an execution test harness, an installer, and a graphical user interface for modifying said suite;

a terminal displaying said suite as a hierarchy on said graphical user interface, qualified test programs from said suite being selectable via said graphical user interface;

a communications facility for transmitting a record of said qualified test programs; and a client terminal linked to said server for hierarchically displaying only said qualified test programs responsively to receiving said record from said server, said qualified test programs being selectable as excluded test programs.

31. The verification system according to claim 30, wherein said record of said qualified test programs comprises a pointer to a node of said hierarchy, wherein all of said test programs in a subtree headed by said node are included in said qualified test programs.

32. The verification system according to claim 30, wherein said server is adapted to download said installer to said client terminal; and wherein responsively to an execution of said installer said server is adapted to download and install at least a portion of said test programs from said central repository to said client terminal for execution using said computing product while avoiding execution of any of said excluded test programs.

* * * * *